(12) United States Patent
Lu et al.

(10) Patent No.: US 8,293,852 B2
(45) Date of Patent: Oct. 23, 2012

(54) PREPARATION METHOD OF QUICK OIL-ABSORBENT MATERIALS

(75) Inventors: Jianmei Lu, Suzhou (CN); Jun Jiang, Yixing (CN)

(73) Assignee: Suzhou Timelyblue Environmental Technology, Co., Ltd., Suzhou (CN)

( * ) Notice: Subject to any disclaimer, the term of this patent is extended or adjusted under 35 U.S.C. 154(b) by 0 days.

(21) Appl. No.: 12/858,763

(22) Filed: Aug. 18, 2010

(65) Prior Publication Data

US 2011/0263418 A1      Oct. 27, 2011

(30) Foreign Application Priority Data

Apr. 23, 2010   (CN) .......................... 2010 1 0161098

(51) Int. Cl.
  *C08F 2/44* (2006.01)
  *C08F 2/00* (2006.01)
  *C08F 220/10* (2006.01)
  *C08F 220/26* (2006.01)
  *C08F 220/56* (2006.01)
  *C08F 222/10* (2006.01)
  *C08F 222/38* (2006.01)
  *C07C 43/14* (2006.01)
  *B01J 20/22* (2006.01)
  *B01J 20/24* (2006.01)
  *B01J 20/26* (2006.01)

(52) U.S. Cl. .......... 526/72; 502/400; 502/401; 502/402; 502/404; 526/303.1; 526/307.2; 526/319; 526/328; 526/329.7; 568/672; 568/673

(58) Field of Classification Search .................. 502/400, 502/401, 402, 404; 526/303.1, 307.2, 319, 526/328, 329.7, 72; 568/672, 673
See application file for complete search history.

(56) References Cited

U.S. PATENT DOCUMENTS 5,374,600 A * 12/1994 Hozumi et al. ............... 502/402
2005/0119424 A1 * 6/2005 Ishii et al. ....................... 526/88

OTHER PUBLICATIONS

Y.F. Cao et al., "Synthesis and Performance of Acrylate Modified Cotton Linter High Oil Absorption Resins", Specialty Petrochemicals, Mar. 2004, China International Book Trading Corp., Beijing, China.

* cited by examiner

*Primary Examiner* — Daniel C McCracken
*Assistant Examiner* — Daniel Berns
(74) *Attorney, Agent, or Firm* — McKenna Long & Aldridge LLP

(57) ABSTRACT

This invention relates to an oil-absorbent polymer and the preparation method thereof, and disclosed a preparation method of quick oil absorbent material, which comprises: (1) Mixing and stirring well monomer A, vinyl monomer, initiator and vesicant to form a copolymerization system, wherein the amount of monomer A is in the range of approximately 10-50 wt %, the amount of vinyl monomer is in the range of approximately 48-88 wt %, the amount of initiator is in the range of approximately 0.01-5 wt %, the amount of vesicant is in the range of approximately 1-5 wt %; (2) And then immersing fiber carriers into the liquid of above-said copolymerization system to adsorb the liquid on the fiber carriers, then heating the fiber carriers under a temperature between 60~80° C. for 1~4 hours to synthesize polymers on the fiber carriers. The quick oil absent material is less dense than water, and has both high adsorption capacity and high adsorption rate, meanwhile it can be repeatedly used and the absorbed valuable oils can be regenerated to reduce cost effectively.

2 Claims, No Drawings

PREPARATION METHOD OF QUICK OIL-ABSORBENT MATERIALS

CROSS-REFERENCES TO RELATED APPLICATIONS

This application claims priority from Chinese Patent Application Number 201010161098.0, filed on Apr. 23, 2010, incorporated by reference in its entirety.

FIELD OF THE INVENTION

This invention relates to a functional polymer material, and more particularly to an oil-absorbent polymer and the preparation method thereof.

BACKGROUND

Various oils currently include gasoline, diesel and other alkanes; benzene, toluene, xylene and other aromatic hydrocarbons; styrene, methyl styrene and other aromatic monomers; acrylic ester monomers; dichloromethane, chloroform and other halogenated hydrocarbons. The above matters are all volatile and highly toxic. Once leaked, the disposal will be very complex.

At present, people usually adopt oil fence to prevent dissipation of oil, and at the same time, recover as much oil as possible using oil absorbents such as oil absorbent pads, mats or felt. Oil absorbent felt is a microfiber absorbent material fabricated by 100% polypropylene. The oil absorbent felt is exclusively for absorbing oils and petroleum liquids, mainly used in marine vessels and oil spills, particularly suitable for handling large-scale crude oil spills. However, oil absorbent felt has many shortcomings when used in actual practice, namely:

(1) Longer processing time. For dealing with emergencies, time is the most important key factor in control pollution. Common oil absorbent felt needs 1-2 days to completely control pollution;

(2) Poor oil holding capability. Common oil absorbent felt absorbs oil by physical adsorption, thus the adsorbed oil will seep out when in use because of extrusion and gravity, so the felt can not remove all the oil from the contaminated water;

(3) Reusability. Common oil absorbent felt can not be reused; and (4) Common oil absorbent felt can not absorb hydrophilic organic matters, besides it absorbs oils together with water in the water system.

The above-said defects greatly restrict the applications of oil absorbent felt. In other words, the felt is not ideal for use in the emergency treatment of water pollution accidents. Thus, a kind of quick oil absorbent material is needed urgently to effectively address disposal of water pollution accidents.

SUMMARY OF THE INVENTION

The object of the present invention is to provide a preparation method of quick oil absorbent material. This object is achieved according to the technical scheme of this invention described below, a preparation method of quick oil absorbent material, which comprises:

(1) Mixing and stirring well monomer A, vinyl monomer, initiator and vesicant to form a liquid copolymerization system, wherein the amount of monomer A is in the range of approximately 10-50 wt %, the amount of vinyl monomer is in the range of approximately 48-88 wt %, the amount of initiator is in the range of approximately 0.01-5 wt %, the amount of vesicant is in the range of approximately 1-5 wt %;

wherein, the said monomer A is selected from one of: Acrylamide, Hydroxyethyl acrylate, Hydroxypropyl acrylate, Tri(ethylene glycol) divinyl ether (TME), functional monomer T-1168, functional monomer TM-200 or Acrylic ester monomer 2-PHA; and wherein, the said vinyl monomer is selected of least one of: α-methylstyrene, Pentaerythritol tetramethyacrylate, Tri(propylene glycol) diacrylate or Diethylene glycol diacrylate,

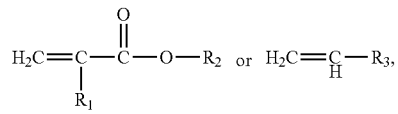

wherein $R_1$ is Methy or Hydrogen, $R_2$ is saturated alkyl of 1 to 18 carbon atoms or naphthyl or phenmethyl, $R_3$ is selected one of: Cyano, Acetate, Phenyl, P-methylphenyl or O-nitrophenyl; and (2) immersing fiber carriers into the liquid of above-said copolymerization system to adsorb the liquid copolymerization system on the fiber carriers, then heating the fiber carriers at a temperature of between 60~80° C. for 1~4 hours to synthesize polymers on the fiber carriers.

In the technical scheme above, the method of afore-said synthesizing polymers on the fiber carriers can be referred to: Y. F. Cao, Z. L. Liu, X. Han, L. Cui, Y. Li, and X. C. Ma. SYNTHESIS AND PERFORMANCE OF ACRYLATE MODIFIED COTTON LINTER HIGH OIL ABSORPTION RESINS. *Speciality Petrochemicals*, 2004, 03.

In the technical scheme above, the said monomer T-1168 is a kind of methacrylate-terminated polyether ester, whose molecular weight is in the range of approximately 1100~1300; the monomer TM-200 is a kind of methyl acrylate monomer, which can be easily polymerized with acrylic and methacrylic acid monomers.

Specifically, in the technical scheme above, the said vinyl monomer can be selected from group of: (methyl) methacrylate, ethyl(meth)acrylate, propyl(meth)acrylate, butyl (meth) acrylate, isobutyl(meth)acrylate, amyl(meth)acrylate, hexyl (meth)acrylate, octyl (meth)acrylate, phenyl(meth)acrylate, benzyl(meth)acrylate, tolyl(meth)acrylate ester, naphthyl (meth)acrylate ester, (meth)acrylic acid cyclohexyl ester, lauryl(meth)acrylate, hexadecyl (meth)acrylate, octadecyl (meth)acrylate, naphthyl methacrylate ester, methacrylic acid benzyl ester, acrylonitrile, vinyl acetate, styrene, vinyl toluene, α-methyl styrene, pentaerythritol tetra (meth)acrylate, tripropylene glycol diacrylate (TPGDA) or diethylene glycol diacrylate (DPGDA).

In the technical scheme above, the initiator may be organic peroxide initiator or azo initiator, wherein said organic peroxide initiator includes peroxy ketals, dialkyl peroxides, diacyl peroxides, peroxy dicarbonate, peroxide esters, ketone peroxide, hydrogen peroxide.

Specifically, in the technical scheme above, the said initiator includes 2,2-bis(tert-butyl peroxy) butane, 2,2-bis(tert-butyl peroxy) octane, tert-butyl peroxide, tert-butyl cumyl peroxide, dicumyl peroxide, α,α-bis(tert-butyl peroxy isopropyl) benzene, acetyl peroxide, isobutyryl peroxide, lauroyl peroxide, benzoyl peroxide, benzoyl peroxide, diisopropyl peroxy dicarbonate, peracetic acid tert-butyl ester, tert-Butyl peroxyisobutyrate, acetyl acetone peroxide, methyl ethyl ketone peroxide, cyclohexanone peroxide, tert-butyl hydrogen peroxide, cumene hydroperoxide, bis(1-methylethyl)phenyl-hydroperoxide, 2,2-azobisisobutyronitrile, 2,2-azo(2-methyl-butyronitrile) and 1,1-azo (1-cyclohexane carbonitrile).

In the technical scheme above, the said vesicant can be physical blowing agents or chemical blowing agents, wherein physical blowing agents are preferably selected from: low-boiling alkane and fluorocarbons, surface active agents, organic blowing agents and inorganic blowing agents, wherein the low-boiling alkane and fluorocarbons include pentane, hexane, heptane, petroleum ether, trichlorofluoromethane, dichlorodifluoromethane, etc. The said surface active agents include sodium dodecyl sulfate, sodium alcohol ether sulphate (AES), dresinate vesicant, animal and plant protein vesicant, sulphite liquor, etc. The said organic blowing agents include azo compounds (azo-bis-ammonium formate, diisopropyl azodiformate, azodiisobutyronitrile, barium azodicarboxylate, etc.), sulfonyl hydrazide compounds (tosyl hydrazine, phenyl sulfonyl hydrazine, OBSH) and nitroso compounds (N,N-dinitroso pentamethylene tetramine, N,N-dinitroso terephthalamide, etc.). The said inorganic blowing agents include sodium bicarbonate, etc.

In the preferred technical scheme, the polymerization temperature should be lower than the decomposition temperature of the initiator. The fiber employed in this invention can be selected from polypropylene fiber, acrylic fiber, polyacrylonitrile fiber, sponge, aramid fiber, non-woven fabrics, etc. Because of lipophilic groups on surface of the afore-said fiber, it can absorb the liquid copolymerization system.

The invention also claims a quick oil absorbent material prepared by the afore-said technical scheme.

Due to the application of the above mentioned technical scheme, this invention has the following advantages compared with the existing techniques.

The invention applies fibers as carriers and synthesizes porous sponge-like oil absorbent polymers on the fiber carriers to prepare a quick oil absorbent material, which floats because it is less dense than water, and the quick oil absorbent material has both high adsorption capacity and high adsorption rate, especially suitable to deal with emergent water pollution accidents quickly. Besides heavy oil such as lubricating oil, it can absorb various toxic and persistent organic pollutants, which includes both hydrophobic and hydrophilic organic pollutants. So it solves the disability of absorbing hydrophilic organic pollutants problem of normal oil absorbents.

The invention provides a quick oil absorbent material that absorbs oil pollutants via chemical adsorption instead of physical adsorption, so it has both a high adsorption capacity and a high adsorption rate, and it can hold absorbed pollutants effectively. In comparison, the absorbed pollutants would be squeezed out from normal oil absorption felt when undergoing extrusion.

The invention provides a quick oil absorbent material that has an excellent selective absorption capacity, and it can absorb oils selectively, which solves the both water and oil absorption problem of normal oil absorption felt.

The invention provides a quick oil absorbent material that can be reused. The sponge-like material can be repeatedly used and the absorbed valuable oils can be regenerated to reduce cost effectively.

DETAILED DESCRIPTION OF THE PREFERRED EMBODIMENTS

This invention will be best understood with reference to the following description of example embodiments.

EXAMPLE 1

(1) Prepare a copolymerization system that contains: Functional monomer acrylamide of 35 wt %, Methyl acrylate of 25 wt %, Ethyl acrylate of 46 wt %, Benzoperoxide of 3 wt %, and blowing agent n-hexane of 1 wt %; mix the above raw materials to form a polymerization system and stir well;

(2) Then immerse acrylic fiber carriers into the liquid of the above copolymerization system to adsorb the liquid on the fiber carriers, then heat the fiber carriers at a temperature of 80° C. for 4 hours to synthesize polymers on the fiber carriers to from a quick oil absorbent material.

EXAMPLE 2

(1) Prepare a copolymerization system that contains: Functional monomer hydroxyethyl acrylate of 50 wt %, Butyl acrylate of 15 wt %, Octyl acrylate of 3 wt %, 2,2-Azobisisobutyronitrile of 2 wt %, Blowing agent azo-bis-ammonium formate of 3 wt %; mix the above raw materials to form a polymerization system and stir well;

(2) Then immerse polypropylene fiber carriers into the liquid of the above copolymerization system to adsorb the liquid on the fiber carriers, then heat the fiber carriers at a temperature of 75° C. for 4 hours to synthesize polymers on the fiber carriers to from a quick oil absorbent material.

EXAMPLE 3

(1) Prepare a copolymerization system that contains: Functional monomer acrylamide of 10 wt %, Ethyl acrylate of 11 wt %, Ethylhexyl acrylate of 38 wt %, Naphthyl methacrylate ester of 46.9 wt %, 2,2-Bis(tert-butyl peroxy)butane of 0.1 wt %, Blowing agent OBSH of 4 wt %; mix the above raw materials to form a polymerization system and stir well;

(2) Then immerse polyethylene fiber carriers into the liquid of above-said copolymerization system to adsorb the liquid on the fiber carriers, then heat the fiber carriers at a temperature of 75° C. for 2 hours to synthesize polymers on the fiber carriers to from a quick oil absorbent material.

EXAMPLE 4

(1) Prepare a copolymerization system that contains: Functional monomer T-1168 of 25 wt %, Benzyl methacrylate of 14 wt %, Vinyltoluene of 17 wt %, Methyl methacrylate of 41 wt %, Acetyl acetone peroxide of 0.5 wt %, Vesicant N,N-dinitroso pentamethylene tetramine of 2.5 wt %; mix the above raw materials to form a polymerization system and stir well;

(2) Then immerse sponge carriers into the liquid of above-said copolymerization system to adsorb the liquid on the fiber carriers, then heat the fiber carriers at a temperature of 75° C. for 2 hours to synthesize polymers on the fiber carriers to from a quick oil absorbent material.

EXAMPLE 5

(1) Prepare a copolymerization system that contains: Functional monomer TM-200 of 18 wt %, Vinyl acetate of 53 wt %, Pentaerythritol tetra (meth) acrylate of 22.5 wt %, Bis(1-methylethyl)phenyl-hydroperoxide of 1.5 wt %, Blowing agent sodium bicarbonate of 5 wt %; mix the above raw materials to form a polymerization system and stir well;

(2) Then immerse non-woven fabric carriers into the liquid of above-said copolymerization system to adsorb the liquid on the fiber carriers, then heat the fiber carriers at a temperature of 75° C. for 4 hours to synthesize polymers on the fiber carriers to from a quick oil absorbent material.

EXAMPLE 6

(1) Prepare a copolymerization system that contains: Functional monomer 2-PHA 22 wt %, Vinyl acetate of 7 wt %, Methyl acrylate of 65.5 wt %, 2,2-Azobisisobutyronitrile of 4.5 wt %, Blowing agent sodium dodecyl sulfate of 5 wt %; mix the above raw materials to form a polymerization system and stir well;

(2) Then immerse teximat carriers into the liquid of above-said copolymerization system to adsorb the liquid on the fiber carriers, then heat the fiber carriers at a temperature of 75° C. for 3 hours to synthesize polymers on the fiber carriers to from a quick oil absorbent material.

EXAMPLE 7

(1) Prepare a copolymerization system that contains: Functional monomer hydroxyethyl acrylate of 22 wt %, Methyl methacrylate of 30 wt %, Vinyl acetate of 7 wt %, Ethylhexyl acrylate of 35.5 wt %, Isobutyryl peroxide of 2.5 wt %, Animal and plant proteins blowing agent of 1 wt %; mix the above raw materials to form a polymerization system and stir well;

(2) Then immerse cotton mat carriers into the liquid of above-said copolymerization system to adsorb the liquid on the fiber carriers, then heat the fiber carriers at a temperature of 75° C. for 3.5 hours to synthesize polymers on the fiber carriers to from a quick oil absorbent material.

EXAMPLE 8

(1) Prepare a copolymerization system that contains: Functional monomer TME of 22 wt %, Styrene of 30 wt %, Octadecyl acrylate of 7 wt %, Ethyl acrylate of 35.5 wt %, Cyclohexanone peroxide of 2.5 wt %, Dresinate blowing agent of 1 wt %; mix the above raw materials to form a polymerization system and stir well;

(2) Then immerse aramid fiber carriers into the liquid of above-said copolymerization system to adsorb the liquid on the fiber carriers, then heat the fiber carriers at a temperature of 80° C. for 4 hours to synthesize polymers on the fiber carriers to from a quick oil absorbent material.

EXAMPLE 9

Immerse 10 g of quick oil absorbent material in benzene (500 g). After absorbing for 10 minutes, the fiber is squeezed under 5 kg pressure and no liquid flow out. The results are shown in following tables:

| Cases | Performance | | | | |
|---|---|---|---|---|---|
| | Oil Absorption/g | Adsorption Rate | Water Absorption | Oil Holding | Number of Replication |
| Example 1 | 4 | Absorb once contact | <8% | Perfect | 60 |
| Example 2 | 10 | Absorb once contact | <8% | Perfect | 20 |
| Example 3 | 7 | Absorb once contact | <8% | Perfect | 40 |
| Example 4 | 3 | Absorb once contact | <8% | Perfect | 60 |

-continued

| Cases | Performance | | | | |
|---|---|---|---|---|---|
| | Oil Absorption/g | Adsorption Rate | Water Absorption | Oil Holding | Number of Replication |
| Example 5 | 5 | Absorb once contact | <8% | Perfect | 80 |
| Example 6 | 6 | Absorb once contact | <8% | Perfect | 100 |
| Example 7 | 15 | Absorb once contact | <8% | Perfect | 100 |
| Example 8 | 18 | Absorb once contact | <8% | Perfect | 100 |

Although the invention has been described with reference to specific embodiments, many modifications and variations of such embodiments can be made without departing from the innovative concepts disclosed. Thus, it is understood by those skilled in the art that alternative forms and embodiments of the invention can be devised without departing from its spirit and scope.

We claim:

1. A preparation method of an oil absorbent material, which comprises:
   (1) mixing and stirring well a monomer A, a vinyl monomer, an initiator and a vesicant to form a copolymerization system, wherein the amount of the monomer A is in the range of approximately 10-50 wt %, the amount of the vinyl monomer is in the range of approximately 48-88 wt %, the amount of the initiator is in the range of approximately 0.01-5 wt %, the amount of the vesicant is in the range of approximately 1-5 wt %;
   wherein, the monomer A is selected from the group consisting of: Acrylamide, Hydroxyethyl acrylate, Hydroxypropyl acrylate, Tri(ethylene glycol) divinyl ether, functional monomer T-1168, functional monomer TM-200 and Acrylic ester;
   wherein, the vinyl monomer is selected from the group consisting of: α-methylstyrene, Pentaerythritol tetramethyacrylate, Tri(propylene glycol) diacrylate or Diethylene glycol diacrylate,

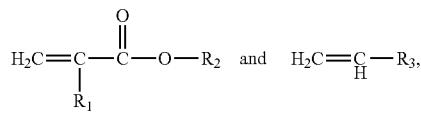

wherein $R_1$ is Methyl or Hydrogen, $R_2$ is saturated alkyl of 1 to 18 carbon atoms or naphthyl or phenylmethyl, $R_3$ is selected from the group consisting of: Cyano, Acetate, Phenyl, P-methylphenyl and O-nitrophenyl;
   (2) immersing a fiber carrier into the copolymerization system to adsorb the copolymerization system on the fiber carrier, and then heating the fiber carrier and the copolymerization system at a temperature between 60~80° C. for 1~4 hours to initiate a polymerization reaction and to synthesize porous sponge-like oil absorbent polymers on the fiber carrier;
   wherein the fiber carrier is selected from the group consisting of: polypropylene fiber, acrylic fiber, polyacrylonitrile fiber, sponge, aramid fiber, and non-woven fabrics.

2. An oil absorbent material prepared by the method of claim 1.

* * * * *